United States Patent [19]

Kaibuki et al.

[11] Patent Number: 4,945,622
[45] Date of Patent: Aug. 7, 1990

[54] AUTOMATIC ASSEMBLY SYSTEM FOR ASSEMBLING PARTS TO A CAR BODY

[75] Inventors: Shigeo Kaibuki; Shinpei Watanabe; Yasuhiro Yamamoto, all of Sayama, Japan

[73] Assignee: Honda Giken Kogyo Kabushiki Kaisha, Tokyo, Japan

[21] Appl. No.: 370,499

[22] Filed: Jun. 23, 1989

[30] Foreign Application Priority Data

Jul. 6, 1988 [JP] Japan ................................ 63-166928

[51] Int. Cl.⁵ ............................................. B23D 21/00
[52] U.S. Cl. .................................................. 29/281.1
[58] Field of Search .................... 901/7, 39; 29/281.1, 29/281.4, 281.5, 271, 783, 785, 786, 822, 823, 824, 701, 703, 714

[56] References Cited

U.S. PATENT DOCUMENTS 4,734,979  4/1988  Sakamoto et al. .................... 29/824
4,736,515  4/1988  Catena .................................. 29/430
4,744,140  5/1988  Bright ................................... 29/271
4,827,598  5/1989  Sakamoto et al. .................... 29/430

FOREIGN PATENT DOCUMENTS

2114067 A   8/1983   United Kingdom .
2191977 A  12/1987   United Kingdom .
2192594 A   1/1988   United Kingdom .

Primary Examiner—Robert C. Watson
Attorney, Agent, or Firm—Armstrong, Nikaido, Marmelstein, Kubovcik & Murray

[57] ABSTRACT

The present invention provides an automatic assembly system, without using an expensive sensor, to enable an assembling jig to be easily positioned with respect to a particular portion of a car body to which parts are to be assembled, in order to facilitate assembling of the parts while reducing production cost. The basic car-body positioning arrangement preferably includes a reference hole, used for positioning, and a seating piece, used for jacking-up the car body.

1 Claim, 5 Drawing Sheets

AUTOMATIC ASSEMBLY SYSTEM FOR ASSEMBLING PARTS TO A CAR BODY

FIELD OF THE INVENTION

This invention relates to an automatic assembly system for assembling parts to a car body using an assembling jig mounted on an automatic machine.

BACKGROUND OF THE INVENTION

While automatically assembling parts to a car body, a car body is usually conveyed by a conveyer to a working station and stopped at a predetermined position there. Thereafter, the position of the car body is detected by a position detector, such as a visual sensor, in order to adjust the position of the assembling jig based upon the detected results. Parts are then assembled to the car body.

Since complicated control operations are necessary, in the above-mentioned automatic assembling system, using expensive sensors such as visual sensors or the like, the cost of equipment is high.

SUMMARY OF THE INVENTION

One object of the present invention is to provide an automatic assembly system, without an expensive sensor as mentioned above, to enable an assembling jig to be easily positioned with respect to a particular portion of a car body to which parts are to be assembled, in order to facilitate assembling of the parts while reducing production cost.

To achieve the above object, the present invention provides an automatic assembly system for assembling parts to a car body in which an assembling jig, which is mounted on an automatic machine, is used to assemble parts to a car body. The assembly system includes a basic car-body positioning arrangement provided on the bottom portion of a car body. Locator holes, for the assembling jig, are formed in the neighborhood of a particular portion of the car body to which parts are to be assembled. The car body is manufactured by maintaining and controlling relative positional accuracy with respect to each of the basic car-body positioning arrangement and the locator holes. The car body is positioned using the basic car-body positioning arrangement. The assembling jig is positioned, using the locator holes, with respect to the particular portion of the car body to which parts are to be assembled so as to ensure an accurate assembling of the parts to the car body.

In this case, it is preferable that the basic car-body positioning arrangement includes a reference hole used especially for positioning and a seating piece for jacking-up the car body. The reference hole is located in the underside of the rear end portion of each of a pair of left and right front side frames of the car body. The seating piece is attached to each of the front and rear end portions of the underside of the car-body side sills to be accurately adjusted in position. The car body is positioned longitudinally and laterally by the reference hole and vertically by the seating piece.

As the car body is positioned using the basic car-body positioning arrangement, a relative positional accuracy is obtained between the locator holes, having a predetermined positional relationship with the basic car-body positioning arrangement, and the automatic machine. The assembling jig is moved to a predetermined position by the automatic machine to face a particular portion of the car body to which parts are to be assembled. Positioning members, such as the locator pins provided on the assembling jig, face the locator holes with their centers relatively aligned to each other. When the assembling jig is moved from the assembling position toward the particular portion of the car body where the parts are to be assembled, the positioning members are accurately fitted into the locator holes to position the assembling jig accurately with respect to the particular portion of the car body to which the parts are to be assembled. Thus, the parts are assembled in the right place.

Since the rear end of the front side frame of the car body is connected to a floor panel or floor frame, it has an extremely high rigidity. Therefore, the reference hole formed in this particular portion is not subjected to deformation even when the positioning pin for positioning of the car body is forcibly fitted therein. This helps to accurately position the car body longitudinally and laterally.

It is also possible to have the car body positioned with respect to the vertical direction by mounting the car body on a positioning bedplate with the side sills thereof placed upon the surface of the bedplate. Since the side sill has a welded flange extending along the underside thereof, usually the vertical positioning accuracy of the car body is often impaired due to the uneven height of the flange so that the car body becomes positioned on a slant. Compared to the above, according to the present invention, when the seating pieces for jacking-up the car body, which are provided on both the front and rear ends of the underside of the side sills, are used as a base for vertical positioning of the car body, the car body can be accurate vertically positioned without being adversely affected by the uneven height of the flange.

DESCRIPTION OF THE PREFERRED EMBODIMENTS

Figure 1:
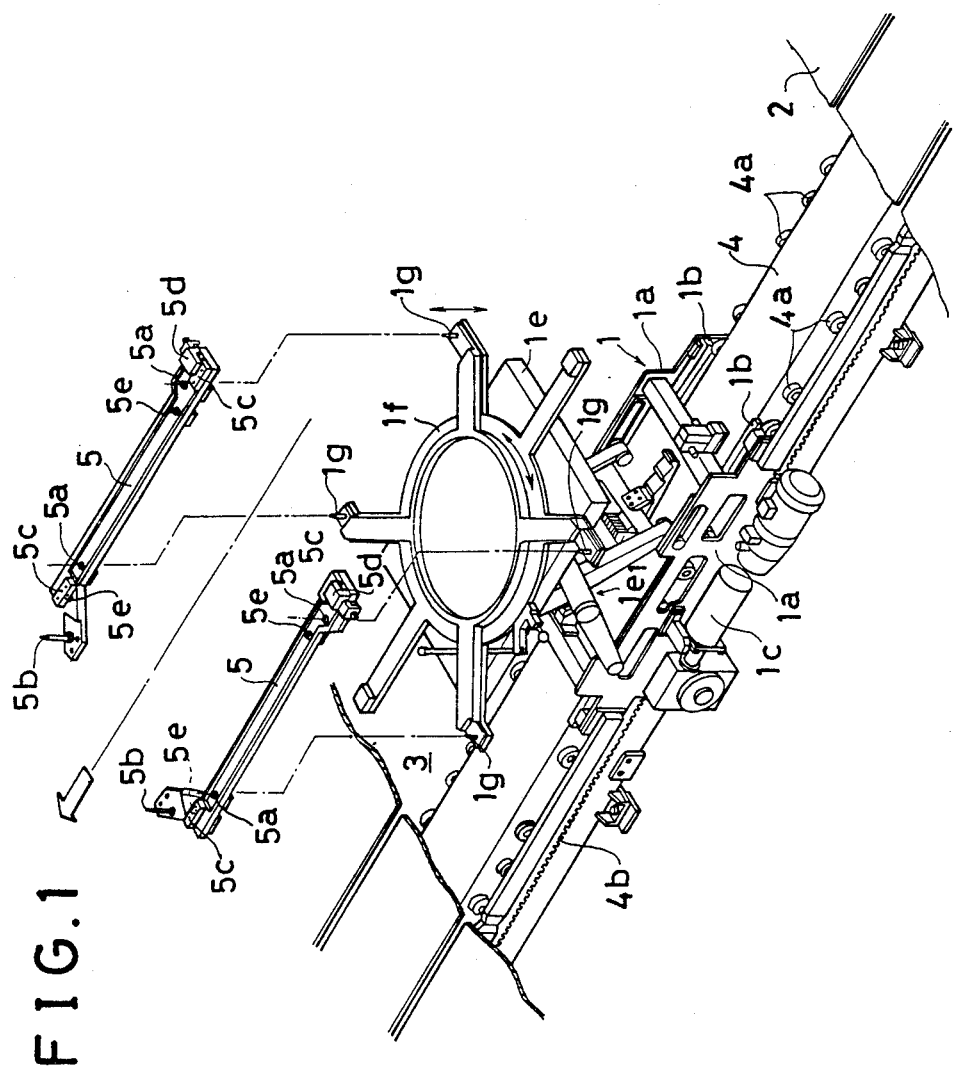
FIG. 1 is a perspective view of a car-body conveying carrier used in an example of the present invention.
Figure 2:
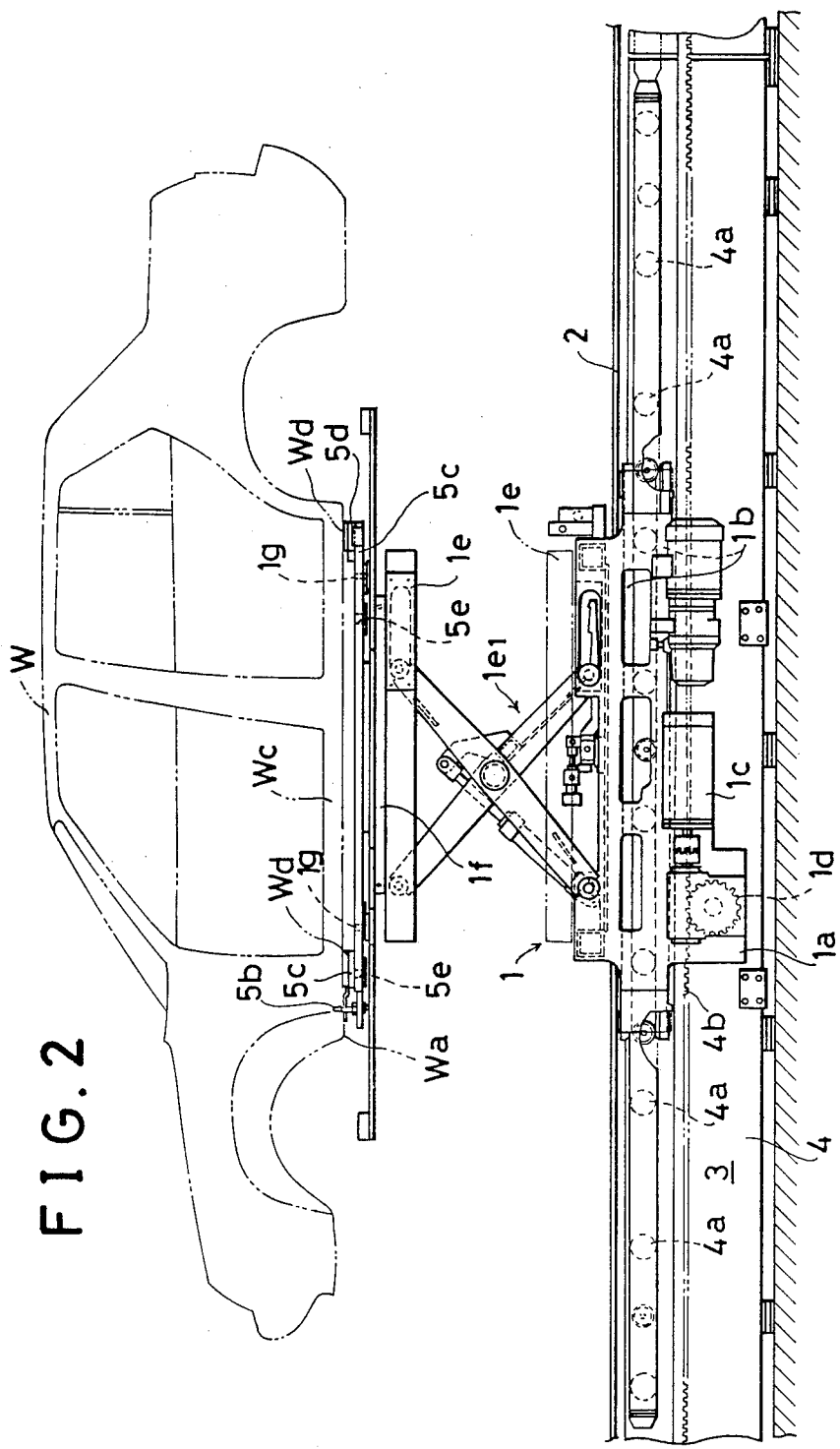
FIG. 2 is a side view thereof.

Referring to FIGS. 1 and 2, a reference number 1 denotes a conveying carrier for conveying a car body W along an assembly line. The conveying carrier 1 is provided with a pair of side plates 1a, 1a which are disposed to face each other with a rectangular pipe-like track frame 4 interposed therebetween. The track frame 4 is located in a pit 3 covered by floor plates 2. Rollers 4a are disposed in a line on both sides of the track frame 4. Attached to the inner surface of each of the side plates 1a, 1a are rails 1b, b which are arranged to have the rollers 4a interposed therebetween, thereby enabling the carrier 1 to be movably supported on the track frame 4. A conveyor motor 1c is mounted on one of the side plates 1a. A pinion 1d, driven by the motor 1c, is meshed with a rack 4b, which is fixedly attached to one side surface of the track frame 4, so that the carrier 1 may be driven to travel along the track frame 4 as the motor 1c is operated.

A lift table 1e is mounted on the top side of the carrier 1. The lift table 1e is moved upward and downward by an X link $1e_1$. A turntable 1f is mounted on the lift table 1e. The turntable 1f is turnable about a vertical axis. A pair of car body receivers 5, 5 are mounted securely on the turntable 1f in such a manner that a pair of front and rear pin holes, provided in each of the car body receivers 5,5, are fitted over a corresponding pair of front and rear pins implanted on the turntable 1f.

Figure 5:
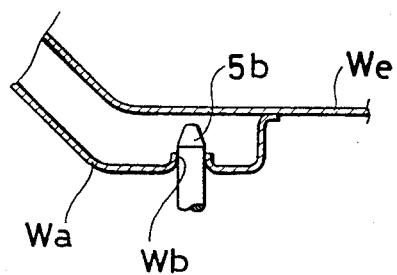
FIGS. 5 and 6 are, respectively, an enlarged sectional view taking along the V—V line in FIG. 3 and taken along the VI—VI line also in FIG. 3.
Figure 6:
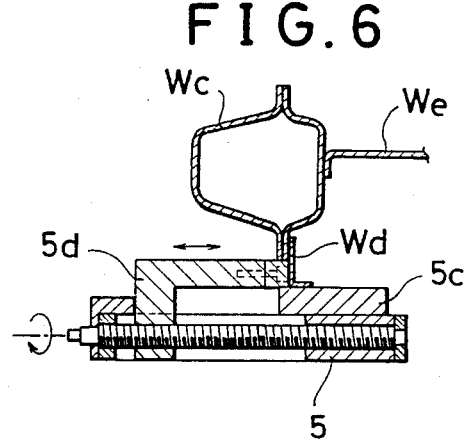
Figure 8:
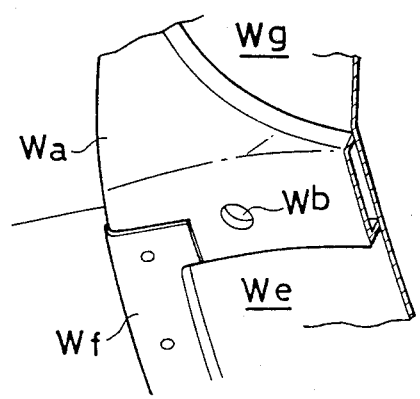
FIG. 8 is a bottom view showing a portion of the car body where the reference hole is formed.

The car body W includes a reference hole Wb and a seating piece Wd. The reference hole Wb consists of a burring hole and is used exclusively for the purpose of positioning the car body. The reference hole Wb is provided in the rear-end underside of each of the left and right front side frames Wa of the car body as shown in FIGS. 5 and 8. The seating piece Wd, for jacking-up the car body, is provided on each of the front and rear ends of the underside of each of the left and right side sills Wc as shown in FIG. 6. The seating piece Wd is precision-engineered. Each of the car body receivers 5 is provided with a reference pin 5b, that fits into the reference hole Wb, and a pair of front and rear bearing seats 5c, 5c for receiving the seating pieces Wd, so that the car body W can be properly positioned longitudinally, laterally and vertically with respect to the car body receivers 5, as shown in FIG. 5. As shown in FIG. 6, a clamping member 5d, which presses the seating piece Wd in the laterally inner direction, is attached to the rear bearing seat 5c so that lateral tilting of the car body W can be restricted. Referring to FIG. 8, the symbol We denotes a floor panel, Wf denotes a floor frame, and Wg denotes a front wheel housing.

Figure 3:
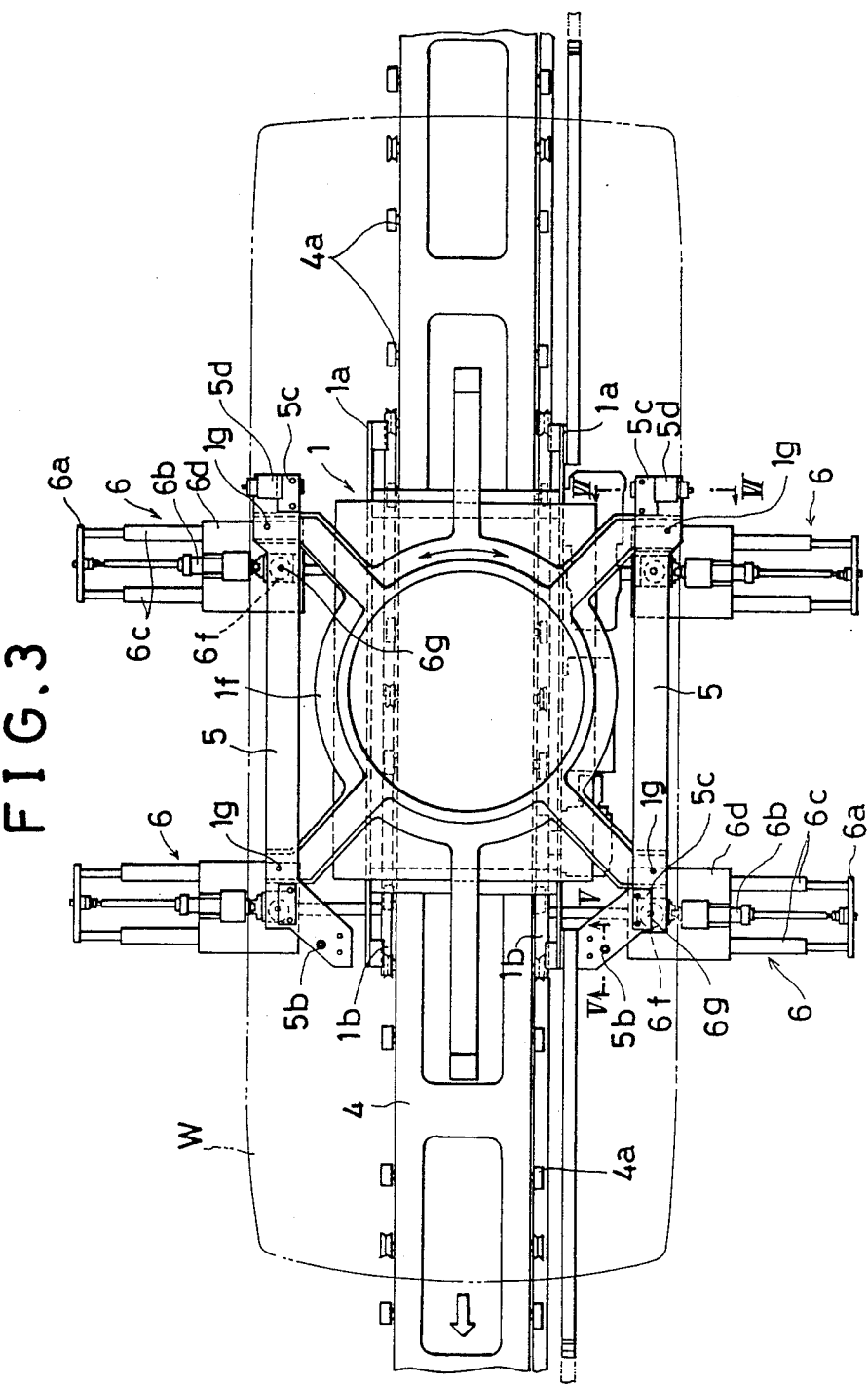
FIG. 3 is a top plan view of a working station for assembling parts.
Figure 4:
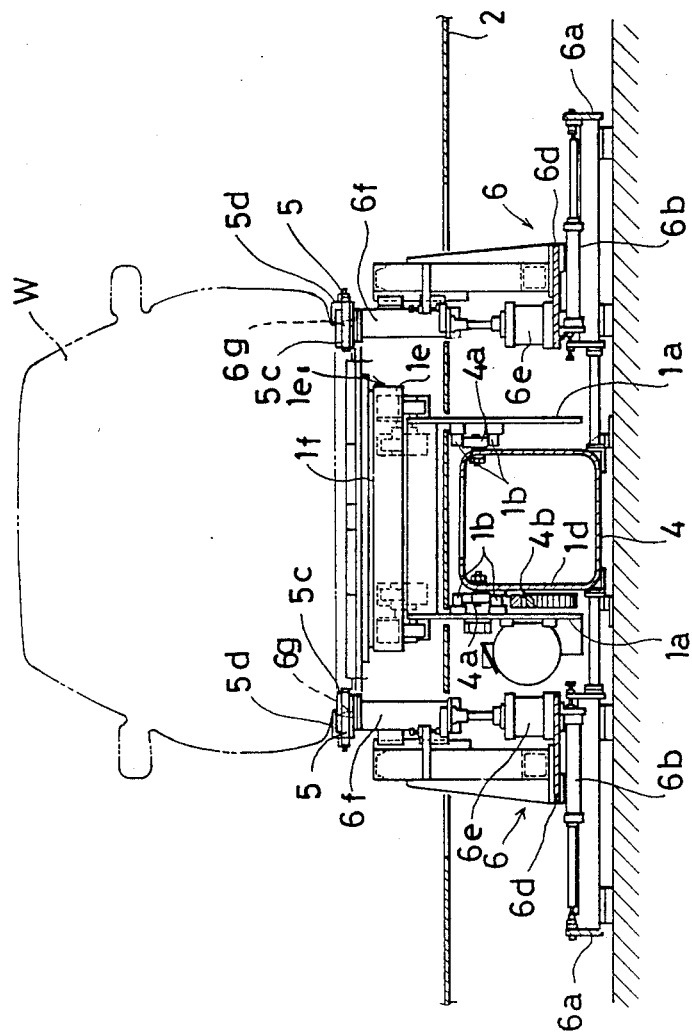
FIG. 4 is a front view thereof.

A working station located along the assembly line, as shown in FIGS. 3 and 4, is provided with front and rear locations each having a pair of positioning units 6. Each pair includes one unit attached to one side of the track frame 4 and the other of the pair attached to the other side of the track frame 4. After the conveying carrier 1 stops at the working station, the car body W is positioned by these positioning units for assembling parts.

Each positioning unit 6 includes a base frame 6a; a slide table 6d mounted on the base frame 6a so that it may be moved laterally back and forth along guide bars 6c, 6c by cylinder 6b; a lift member 6f mounted on the slide table 6d and moved upward and downward by a cylinder 6e; and a pair each of front and rear positioning pins 6g, 6g erected on the lift member 6f to fit in the corresponding pair of the front and rear positioning holes 5e, 5e formed in the car body receiver 5. After the conveying carrier 1 stops, the slide table 6d is advanced toward the track frame 4 to move the lift member 6f upward. Each positioning pin 6g is then fitted into each positioning hole 5e in order to lift up the car body receivers 5. The car body W is positioned on the car body receivers 5 using the reference hole Wb and the seating pieces Wd as described in the foregoing.

Figure 7:
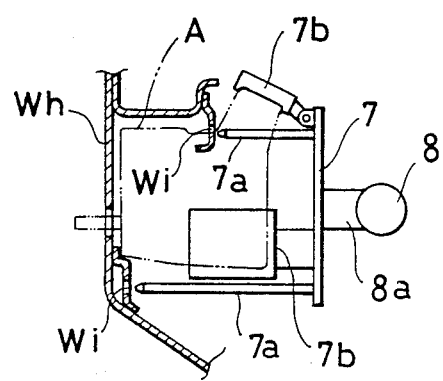
FIG. 7 is a side view of the assembling jig.

Referring to FIG. 7, reference number 7 denotes an assembling jig for a heater unit A. The jig is so mounted on a robot arm 8 through a suitable floating mechanism 8a to be vertically and laterally floatingly movable. After having positioned the car body W in the working station, as described in the foregoing, the robot arm 8 moves the assembling jig 7 to the predetermined assembling position at which the jig faces the dashboard Wh of the car body W. Next, the assembling jig 7 is advanced toward the dashboard Wh for assembling the heater unit A into the dashboard Wh.

Locator holes Wi are formed on the dashboard Wh. Locator pins 7a, provided on the assembling jig 7, can be fitted into locator holes Wi. The car body W is manufactured under a control that maintains the relative positional accuracy with respect to these locator holes Wi, and the reference holes Wb and seating pieces Wd which serve as the reference for positioning the car body W. Thus, when the assembling jig 7 is moved to the predetermined assembling position, the locator pins 7a face the locator holes Wi in a condition in which they are fairly sufficiently center-aligned with each other, so that as the assembling jig 7 is floatingly advanced from the assembling position, the locator pins 7a may be accurately fitted in the locator holes Wi to enable the assembling jig 7 to assemble the heating unit A accurately with respect to the dashboard Wh. A clamp member 7b is also provided on the assembling jig 7 as shown in FIG. 7.

In the foregoing, the present invention has been explained with reference to an embodiment in which a heater unit A is assembled to the dashboard Wh. In other cases, where other parts are similarly assembled using an assembling jig mounted on an automatic machine such as a robot, the assembling jig is properly positioned in the same manner as above by using the locator holes formed near a portion or location to which parts are to be assembled.

As is apparent from the foregoing description, according to the first aspect of the present invention, the car body is positioned by means of the basic car-body positioning arrangement. The assembling jig is then positioned simply and accurately with respect to a particular portion of the car body, to which parts are to be assembled, using the locator holes formed in the neighborhood of the particular portion. Thus, not only is the use of expensive visual sensors eliminated but also the positioning control is made simpler and easier. The result is that equipment cost is greatly reduced.

In addition, according to the second aspect of the present invention, the car-body positioning accuracy is improved so much that there is a decrease in the frequency of occurrence of an assembling error which results in a further improvement in productivity.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What we claim is:

1. An automatic assembly system for assembling parts to a car body in which an assembling jig, mounted on an automatic machine, is used to assemble said parts to said car body, said system comprising:

basic car-body positioning members provided on a bottom portion of said car body, said basic car-body positioning members include,
a reference hole provided, exclusively for positioning use, on an underside of a rear end portion of each of a pair of left and right front side frames of the car body, and
a seating piece for jacking-up the car body, said seating piece being attached to each of the front and rear end portions of the underside of the car-body side sills to be accurately adjusted in position, so that the car body is positioned longitudinally and laterally by said reference hole and is positioned vertically by said seating piece; and
locator holes for the assembling jig formed in a region of a particular portion of the car body to which said parts are to be assembled;

wherein, said car body being manufactured through maintaining control of relative positional accuracy with respect to each of the basic car-body positioning members and the locator holes, wherein said car body being positioned by using said basic car-body positioning members and, by using the locator holes, the assembling jig is positioned with respect to the particular portion of the car body to which said parts are to be assembled to ensure an accurate assembling of said parts to the car body.

* * * * *